United States Patent
Von Kerens

(10) Patent No.: US 6,173,906 B1
(45) Date of Patent: Jan. 16, 2001

(54) LANDSCAPING STRUCTURE SYSTEM

(76) Inventor: John K. Von Kerens, 824 63rd St., Donners Grove, IL (US) 60516

( * ) Notice: Under 35 U.S.C. 154(b), the term of this patent shall be extended for 0 days.

(21) Appl. No.: 09/473,729

(22) Filed: Dec. 28, 1999

(51) Int. Cl.$^7$ .................................................. B05B 15/06
(52) U.S. Cl. ............................. 239/273; 52/102; 47/33
(58) Field of Search .................................. 239/273, 276, 239/279, 200, 201, 204, 536; 52/102; 47/33

(56) References Cited

U.S. PATENT DOCUMENTS

| | | | |
|---|---|---|---|
| 3,865,309 | * 2/1975 | Greenhalgh | 239/276 X |
| 3,933,311 | * 1/1976 | Lemelson | 239/276 |
| 4,278,364 | 7/1981 | Frehner | 405/273 |
| 4,787,185 | 11/1988 | Gascho | 52/233 |
| 4,824,019 | * 4/1989 | Lew | 239/279 X |
| 4,834,585 | 5/1989 | Hasenwinkle et al. | 405/284 |
| 4,840,003 | 6/1989 | Lucas et al. | 52/233 |
| 4,945,675 | * 8/1990 | Kendrick | 47/33 |
| 5,535,545 | * 7/1996 | Matz | 47/33 |
| 5,542,787 | 8/1996 | Charlanow | 405/258 |
| 5,768,824 | * 6/1998 | Matz | 47/33 |
| 5,820,304 | 10/1998 | Sorheim et al. | 405/286 |
| 5,857,493 | * 1/1999 | Matz | 52/102 X |
| 6,021,599 | * 2/2000 | Matz | 239/276 X |

* cited by examiner

Primary Examiner—Lesley D. Morris
(74) Attorney, Agent, or Firm—Joseph N. Breaux

(57) ABSTRACT

A landscaping structure system for building landscaping structures on property to decorate around buildings and the like. The landscaping structure system includes a number of timber elements formed from plastic or the like that are interconnectable to for a desired structure. Some of the timber members include structural cavities and channels for the installation of landscaping elements such as sprinkler systems and ornamental lighting systems.

8 Claims, 5 Drawing Sheets

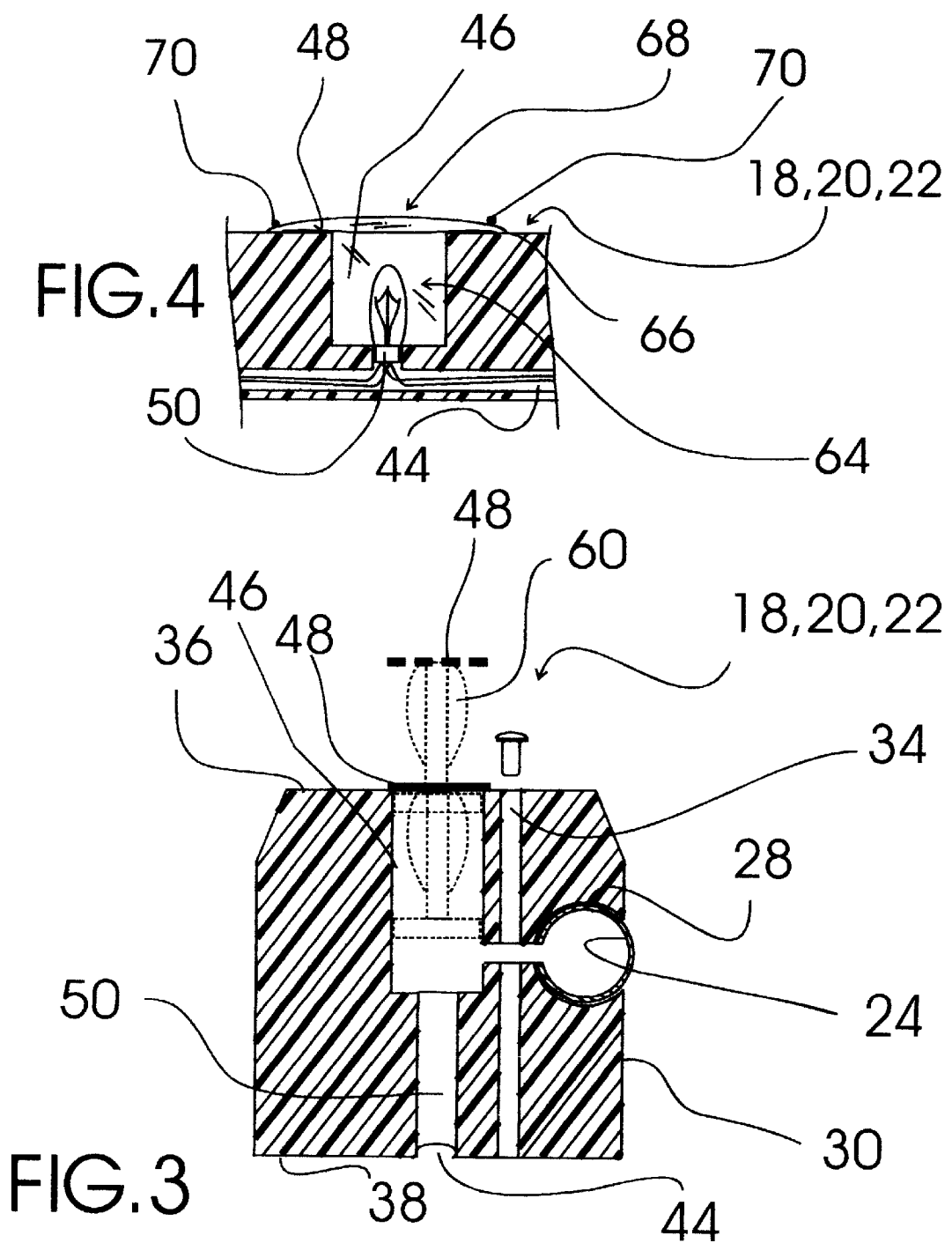

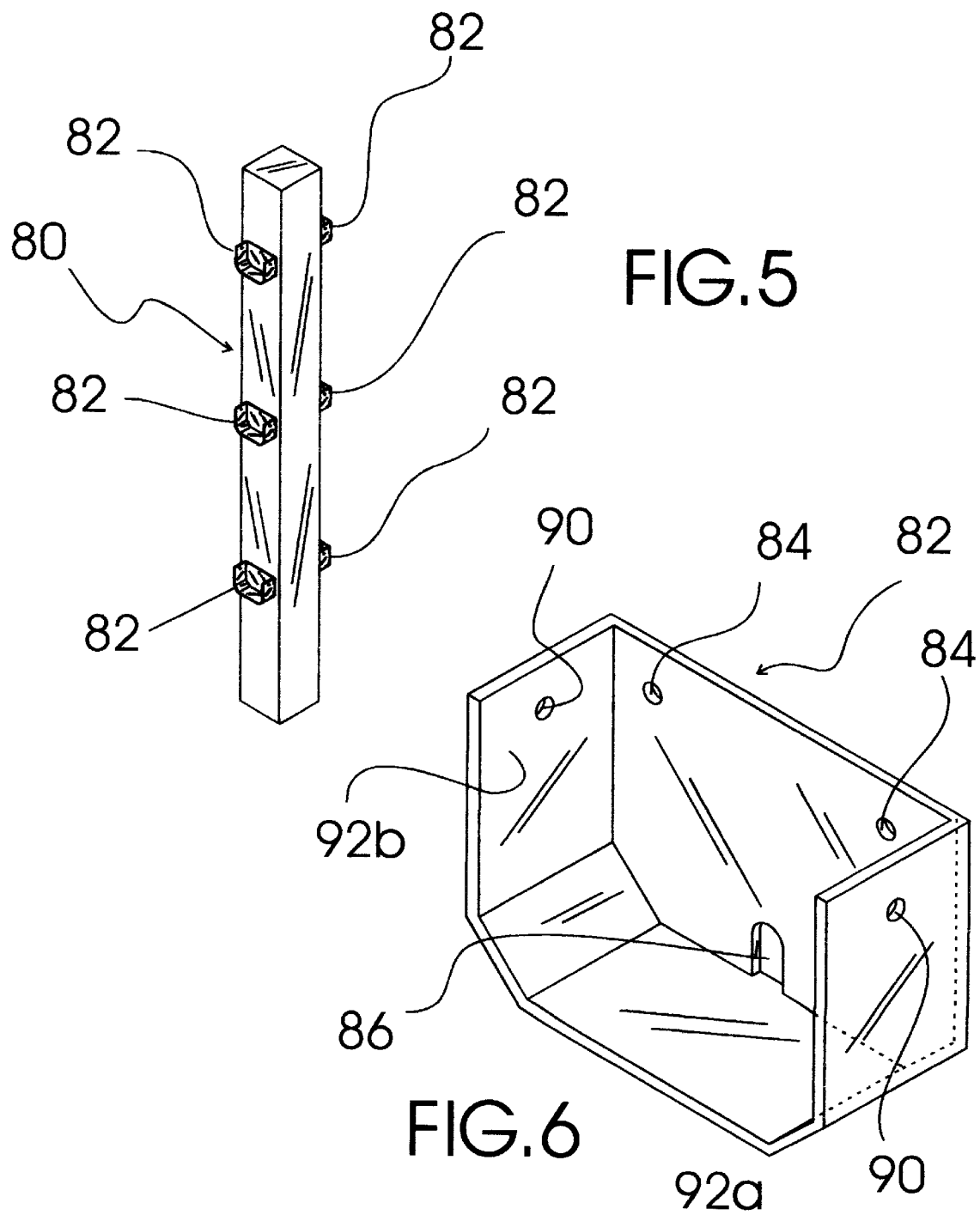

LANDSCAPING STRUCTURE SYSTEM

TECHNICAL FIELD

The present invention relates to landscaping structures and more particularly to a landscaping structure system that includes a number of straight fill timber sections, a number of right angle fill timber sections, a number of straight accessory timber sections, a number of right angle accessory timber sections, a length of sprinkler feed hose having a first diameter, and a number of vertical anchor members having a second diameter; each of the number of straight fill timber sections, the number of right angle fill timber sections, the number of straight accessory timber sections, and the number of right angle accessory timber sections having a sprinkler feed hose channel formed into an interior sidewall adjacent each end thereof being of a feed hose channel diameter sized to friction fit receive section of the length of sprinkler feed hose, each sprinkler feed hose channel having a semicircular channel cross section of with an angular displacement of between 190 and 220 degrees such that a section of sprinkler feed hose is held in place once snap fit therein; each of the number of straight fill timber sections, the number of right angle fill timber sections, the number of straight accessory timber sections, and the number of right angle accessory timber sections having a plurality of vertical anchor member receiving apertures formed therethrough between top and bottom timber section surfaces and positioned such that at least one vertical anchor member receiving aperture of one timber section is alignable with at least one vertical anchor member receiving aperture of a second timber section supported thereon to build a structure to allow a vertical anchor member to be positioned through the aligned vertical anchor member receiving apertures and into the ground to anchor multiple timber sections in place; each of the number of straight accessory timber sections and the number of right angle accessory timber sections also including a conduit channel formed into a bottom surface thereof along the entire length thereof, an accessory positioning cavity formed into a top surface thereof, a removable cap member for covering an opening through the top surface into the accessory positioning cavity, and a connecting passageway formed in connection between the accessory positioning cavity and the conduit channel.

BACKGROUND ART

It is often desirable to construct landscaping structures on property to decorate around buildings and the like. It would be desirable, therefore, to have a landscaping structure system that would allow individuals to rapidly build landscape structures. Because the landscape structures are typically exposed to inclimate weather conditions, it would be a further benefit if the system included timber members formed from a plastic material that could withstand long exposure to the elements. Also, because landscape structures are often associated with other landscaping elements such as sprinkler systems and ornamental lighting systems, it would be a benefit if the landscaping system included timbers easily adapted for receiving and holding landscaping accessories such as sprinkler heads and light bulbs and sockets.

GENERAL SUMMARY DISCUSSION OF INVENTION

It is thus an object of the invention to provide a landscaping structure system that includes timbers easily adapted for receiving and holding landscaping accessories such as sprinkler heads and light bulbs and sockets.

It is a further object of the invention to provide a landscaping structure system that includes a number of straight fill timber sections, a number of right angle fill timber sections, a number of straight accessory timber sections, a number of right angle accessory timber sections, a length of sprinkler feed hose having a first diameter, and a number of vertical anchor members having a second diameter; each of the number of straight fill timber sections, the number of right angle fill timber sections, the number of straight accessory timber sections, and the number of right angle accessory timber sections having a sprinkler feed hose channel formed into an interior sidewall adjacent each end thereof being of a feed hose channel diameter sized to friction fit receive a section of the length of sprinkler feed hose, each sprinkler feed hose channel having a semicircular channel cross section of with an angular displacement of between 190 and 220 degrees such that a section of the length of sprinkler feed hose is held in place once snap fit therein; each of the number of straight fill timber sections, the number of right angle fill timber sections, the number of straight accessory timber sections, and the number of right angle accessory timber sections having a plurality of vertical anchor member receiving apertures formed therethrough between top and bottom timber section surfaces and positioned such that at least one vertical anchor member receiving aperture of one timber section is alignable with at least one vertical anchor member receiving aperture of a second timber section supported thereon to build a structure to allow a vertical anchor member to be positioned through the aligned vertical anchor member receiving apertures and into the ground to anchor multiple timber sections in place; each of the number of straight accessory timber sections and the number of right angle accessory timber sections also including a conduit channel formed into a bottom surface thereof along the entire length thereof, an accessory positioning cavity formed into a top surface thereof, a removable cap member for covering an opening through the top surface into the accessory positioning cavity, and a connecting passageway formed in connection between the accessory positioning cavity and the conduit channel.

Accordingly, a landscaping structure system is provided. The landscaping structure system includes a number of straight fill timber sections, a number of right angle fill timber sections, a number of straight accessory timber sections, a number of right angle accessory timber sections, a length of sprinkler feed hose having a first diameter, and a number of vertical anchor members having a second diameter; each of the number of straight fill timber sections, the number of right angle fill timber sections, the number of straight accessory timber sections, and the number of right angle accessory timber sections having a sprinkler feed hose channel formed into an interior sidewall adjacent each end thereof being of a feed hose channel diameter sized to friction fit receive a section of the length of sprinkler feed hose, each sprinkler feed hose channel having a semicircular channel cross section of with an angular displacement of between 190 and 220 degrees such that a section the length of sprinkler feed hose is held in place once snap fit therein; each of the number of straight fill timber sections, the number of right angle fill timber sections, the number of straight accessory timber sections, and the number of right angle accessory timber sections having a plurality of vertical anchor member receiving apertures formed therethrough between top and bottom timber section surfaces and positioned such that at least one vertical anchor member receiving aperture of one timber section is alignable with at least one vertical anchor member receiving aperture of a second timber section supported thereon to build a structure to allow a vertical anchor member to be positioned through the aligned vertical anchor member receiving apertures and into the ground to anchor multiple timber sections in place; each of the number of straight accessory timber sections and the number of right angle accessory timber sections also including a conduit channel formed into a bottom surface thereof along the entire length thereof, an accessory positioning cavity formed into a top surface thereof, a removable cap member for covering an opening through the top surface into the accessory positioning cavity, and a connecting passageway formed in connection between the accessory positioning cavity and the conduit channel.

In another aspect of the invention, the landscaping structure system also includes a number of curved fill timber sections and a number of curved accessory timber sections.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 3 is a horizontal cross section detail view of one of the accessory timber sections showing the conduit channel formed into a bottom surface thereof along the entire length thereof, the accessory positioning cavity formed into a top surface thereof, representative pop-up water sprinkler head accessory including a removable cap member for covering the opening through the top surface into the accessory positioning cavity, the connecting passageway formed in connection between the accessory positioning cavity and the conduit channel, the sprinkler feed hose channel formed into the interior sidewall, a section of the length of sprinkler feed hose locked into the sprinkler feed hose channel, one of the vertical anchor member receiving apertures formed between the top and bottom timber surfaces, and a sealing cap for sealing unused vertical anchor member receiving cavities.

FIG. 4 is a longitudinal cross section detail view of one of the accessory timber sections showing the conduit channel formed into a bottom surface thereof along the entire length thereof, the accessory positioning cavity formed into a top surface thereof, representative light bulb socket and bulb positioned within the accessory positioning cavity and sealed therein with a sealing gasket positioned between the top surface of the timer member and lamp lens.

FIG. 5 is a perspective view of an exemplary embodiment of a vertical post member of the landscaping structure system of the present invention showing a post portion having a number of timber member receiving brackets secured to opposed sidewalls thereof.

FIG. 6 is a perspective view of one of the timber member receiving brackets of FIG. 5 showing the vertical post member attachment apertures and the conduit connecting aperture provided through a back surface of the bracket and two timber section attachment apertures formed through opposed bracket sidewalls.

EXEMPLARY MODE FOR CARRYING OUT THE INVENTION

Figure 1:
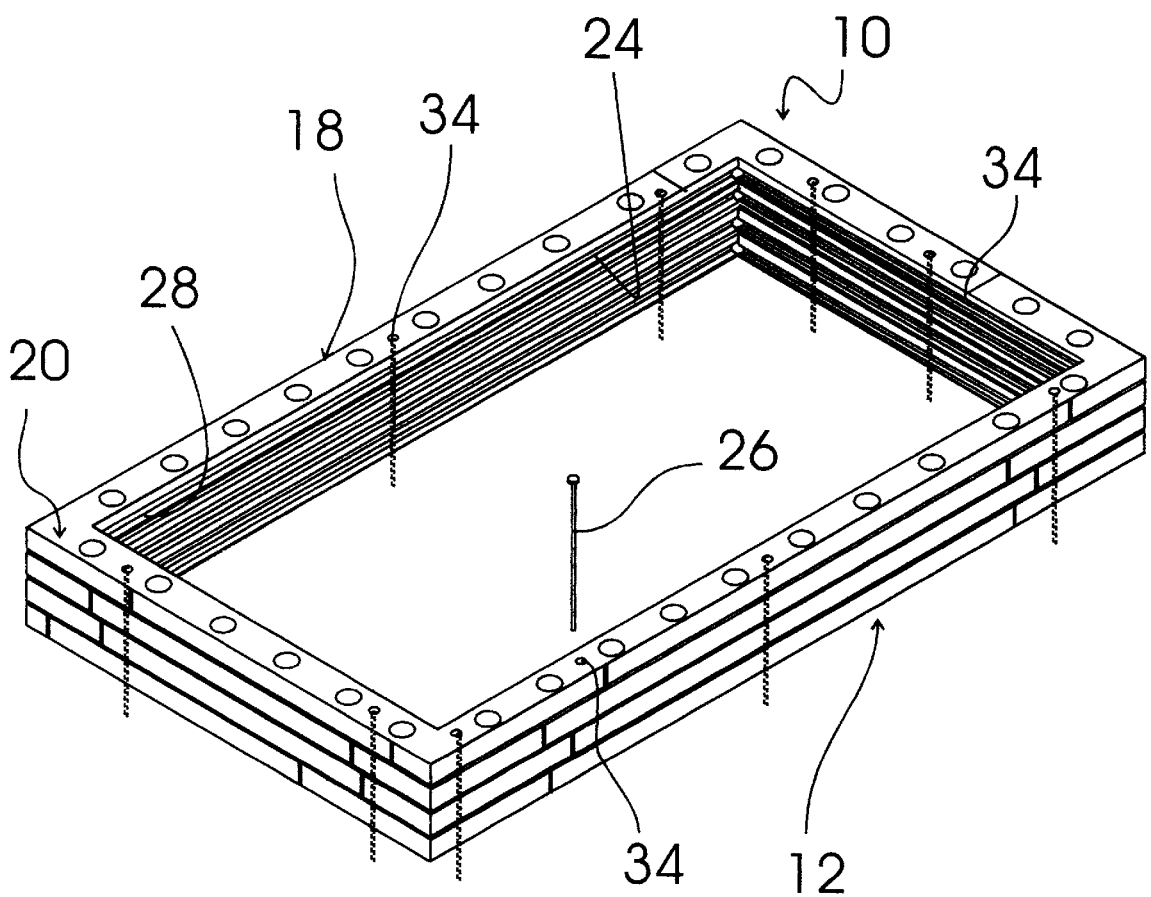
FIG. 1 is a perspective view of an exemplary embodiment of the landscaping structure system of the present invention showing a number of straight fill timber sections, a number of right angle fill timber sections, a number of straight accessory timber sections, a number of right angle accessory timber sections, a length of sprinkler feed hose having a first diameter, and a number of vertical anchor members having a second diameter; each of the number of straight fill timber sections, the number of right angle fill timber sections, the number of straight accessory timber sections, and the number of right angle accessory timber sections having a sprinkler feed hose channel formed into an interior sidewall adjacent each end thereof being of a feed hose channel diameter sized to friction fit receive a section of the length of sprinkler feed hose, each sprinkler feed hose channel having a semicircular channel cross section of with an angular displacement of between 190 and 220 degrees such that a section of the length of sprinkler feed hose is held in place once snap fit therein; each of the number of straight fill timber sections, the number of right angle fill timber sections, the number of straight accessory timber sections, and the number of right angle accessory timber sections having a plurality of vertical anchor member receiving apertures formed therethrough between top and bottom timber section surfaces and positioned such that at least one vertical anchor member receiving aperture of one timber section is alignable with at least one vertical anchor member receiving aperture of a second timber section supported thereon to build a structure to allow a vertical anchor member to be positioned through the aligned vertical anchor member receiving apertures and into the ground to anchor multiple timber sections in place; each of the number of straight accessory timber sections and the number of right angle accessory timber sections also including a conduit channel formed into a bottom surface thereof along the entire length thereof, an accessory positioning cavity formed into a top surface thereof, a removable cap member for covering an opening through the top surface into the accessory positioning cavity, and a connecting passageway formed in connection between the accessory positioning cavity and the conduit channel.
Figure 2:
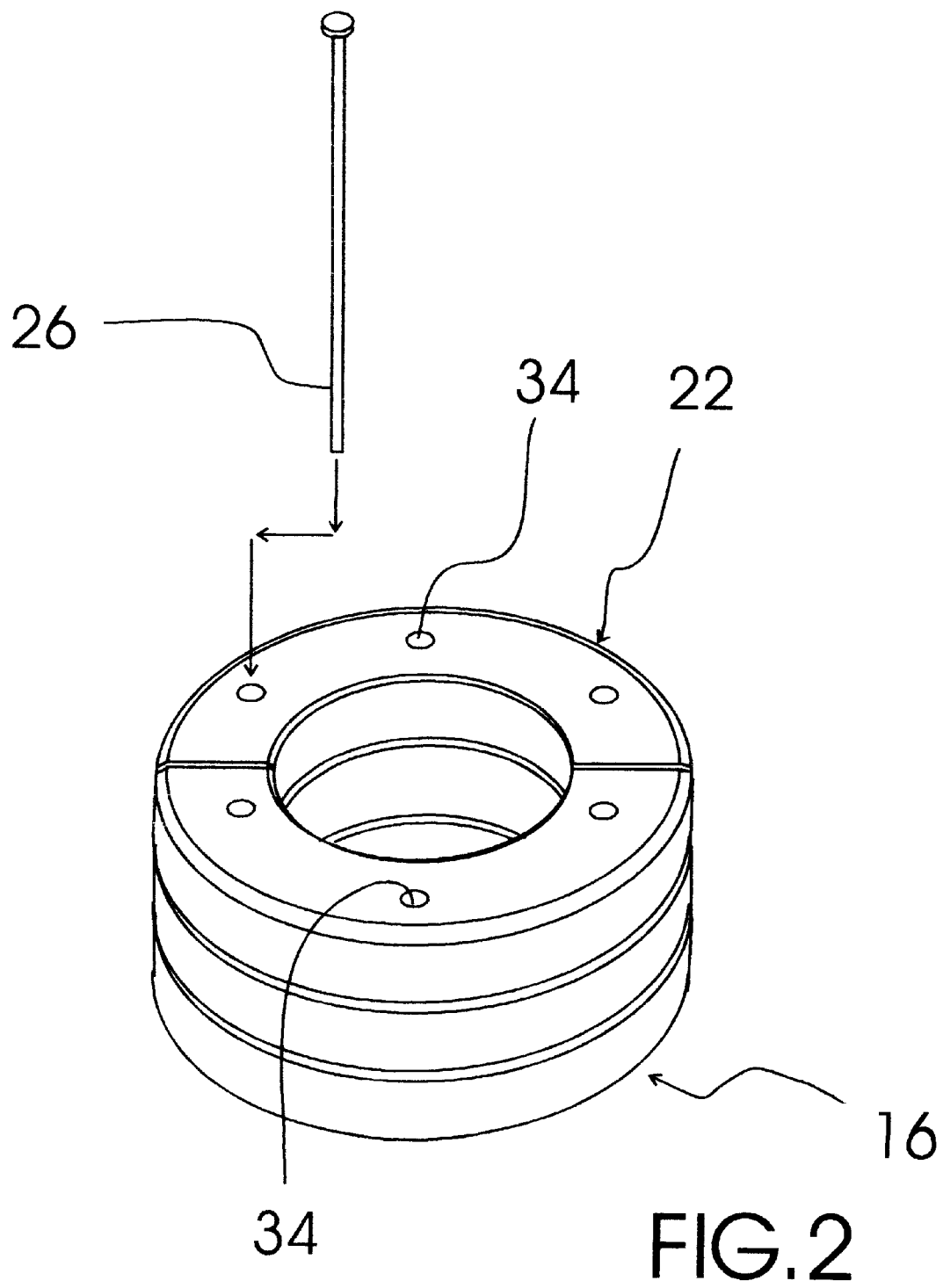
FIG. 2 is a perspective view of a second exemplary embodiment of the landscaping structure system of the present invention showing a number of curved fill timber sections and a number of curved accessory timber sections interlocked to form a ring landscape structure suitable for a round flower bed, surrounding the base of a tree, etc.
Figure 7:
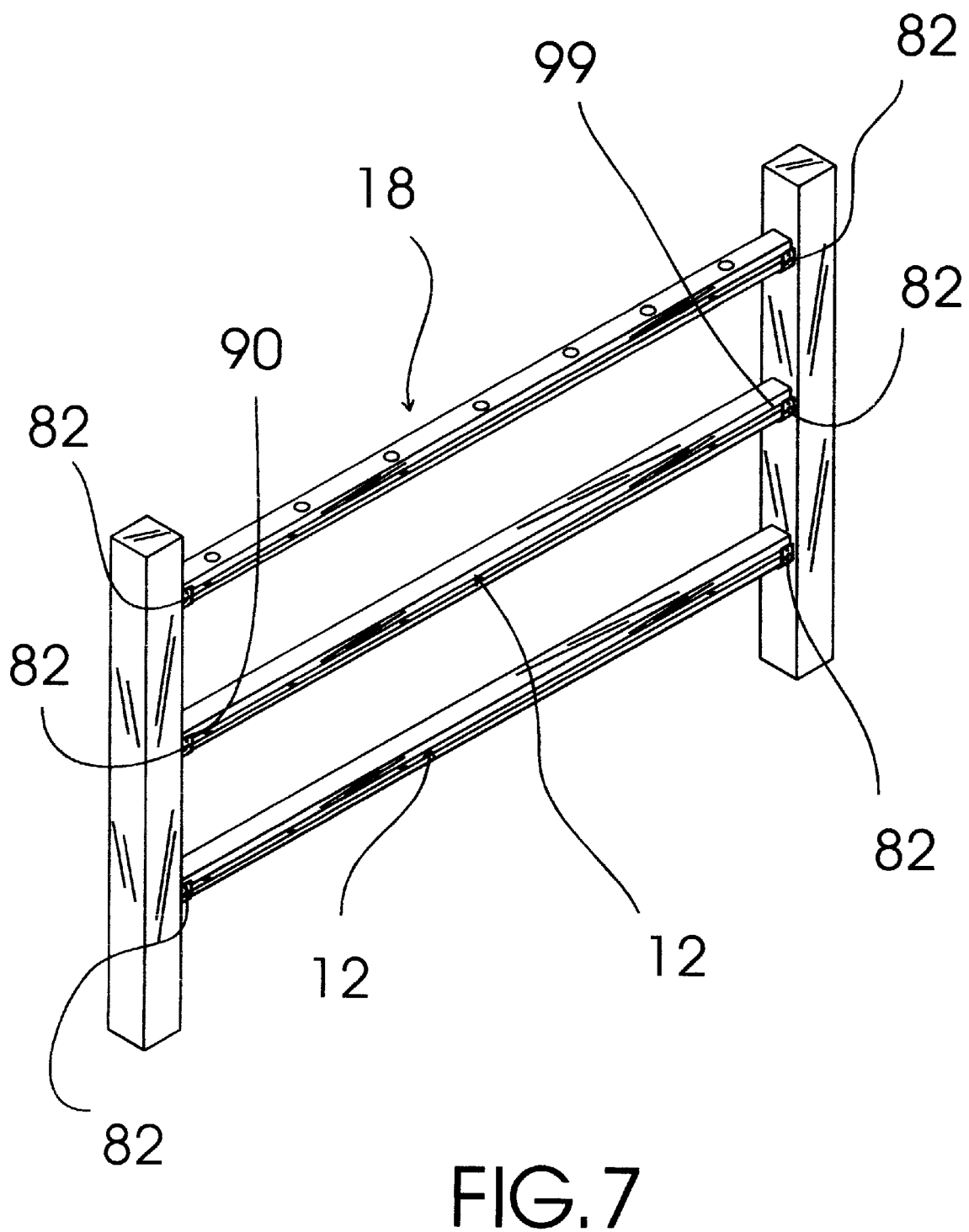
FIG. 7 is a perspective view of an exemplary embodiment of a fence section constructed by securing two straight fill timber sections and one straight accessory timber sections between two of the vertical post members of FIG. 5.

FIGS. 1–7 show exemplary embodiments of the landscaping structure system of the present invention generally designated 10. Landscaping structure system 10 includes a number of straight fill timber sections, each generally designated 12; a number of right angle fill timber sections, each generally designated 14; a number of curved fill timber sections, each generally designated 16 (FIG. 2); a number of straight accessory timber sections, each generally designated 18; a number of right angle accessory timber sections, each generally designated 20; a number of curved accessory timber sections, each generally designated 22; a length of sprinkler feed hose 24 having a first diameter, and a number of vertical anchor members 26 having a second diameter.

Each of the number of straight fill timber sections 12, the number of right angle fill timber sections 14, the number of curved fill timber sections 16, the number of straight accessory timber sections 18, the number of right angle accessory timber sections 20, and the number of curved accessory timber sections 22 having a sprinkler feed hose channel 28 (see FIG. 3) formed into an interior sidewall adjacent each end thereof being of a feed hose channel diameter sized to friction fit receive a section of the length of sprinkler feed hose 24. Each sprinkler feed hose channel has a semicircular channel cross section with an angular displacement of between 215 degrees such that a section of the length of sprinkler feed hose 24 is held in place once snap fit therein.

Each of the number of straight fill timber sections 12, the number of right angle fill timber sections 14, the number of curved fill timber sections 16, the number of straight accessory timber sections 18, the number of curved accessory timber sections 22 and the number of right angle accessory timber sections 20 has a plurality of vertical anchor member receiving apertures 34 formed therethrough between top and bottom timber section surfaces 36, 38 (FIG. 3) and positioned such that at least one vertical anchor member receiving aperture 34 of one timber section is alignable with at least one vertical anchor member receiving aperture 34 of a second timber section supported thereon to build a structure to allow a vertical anchor member 26 to be positioned through the aligned vertical anchor member receiving apertures 34 and into the ground to anchor multiple timber sections in place.

Referring in particular to FIGS. 3 and 4, each of the number of straight accessory timber sections 18, the number of curved accessory timber sections 22 and the number of right angle accessory timber sections 20 also include a conduit channel 44 formed into a bottom surface 38 thereof along the entire length thereof; an accessory positioning cavity 46 formed into a top surface 36 thereof, a removable cap member 48 for covering an opening through top surface 36 into accessory positioning cavity 46; and a connecting passageway 50 formed in connection between accessory positioning cavity 46 and conduit channel 44. As shown in FIG. 3, accessory cavity 46 can have a sprinkler head 60 installed therein that pops up when water pressure is applied to lift removable cap member 48 out of position. As shown in FIG. 4, a light bulb and socket 64 can be installed within accessory cavity 46. When this option is chosen, accessory cavity 46 is sealed with a gasket 66 and a lens 68 that functions as removable cap 48 that is secured in position with screws 70.

In another aspect of the invention a number of vertical post members, generally designated 80 are also included in landscaping structure system 10. Each post portion 80 has a number of timber member receiving brackets, generally designated 82 secured to at least one sidewall thereof and preferably to opposed sidewalls for constructing fences and the like. Referring to FIG. 6, each timber member receiving bracket includes vertical post member attachment apertures 84 and a conduit connecting aperture 86 provided through a back surface 88 thereof and two timber section attachment apertures 90 formed through opposed bracket sidewalls 92a, 92b. In use, the end 99 of straight timber members 12,18 are installed within timber member receiving brackets 82 after vertical post members 80 are planted into the ground to form a fence or the like.

It can be seen from the preceding description that a landscaping structure system has been provided.

It is noted that the embodiment of the landscaping structure system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A landscaping structure system comprising:

a number of straight fill timber sections, a number of right angle fill timber sections, a number of straight accessory timber sections, a number of right angle accessory timber sections, a length of sprinkler feed hose having a first diameter, and a number of vertical anchor members having a second diameter; each of the number of straight fill timber sections, the number of right angle fill timber sections, the number of straight accessory timber sections, and the number of right angle accessory timber sections having a sprinkler feed hose channel formed into an interior sidewall adjacent each end thereof being of a feed hose channel diameter sized to friction fit receive a section of the length of sprinkler feed hose, each sprinkler feed hose channel having a semicircular channel cross section of with an angular displacement of between 190 and 220 degrees such that a section of the length of sprinkler feed hose is held in place once snap fit therein; each of the number of straight fill timber sections, the number of right angle fill timber sections, the number of straight accessory timber sections, and the number of right angle accessory timber sections having a plurality of vertical anchor member receiving apertures formed therethrough between top and bottom timber section surfaces and positioned such that at least one vertical anchor member receiving aperture of one timber section is alignable with at least one vertical anchor member receiving aperture of a second timber section supported thereon to build a structure to allow a vertical anchor member to be positioned through the aligned vertical anchor member receiving apertures and into the ground to anchor multiple timber sections in place; each of the number of straight accessory timber sections and the number of right angle accessory timber sections also including a conduit channel formed into a bottom surface thereof along the entire length thereof, an accessory positioning cavity formed into a top surface thereof, a removable cap member for covering an opening through the top surface into the accessory positioning cavity, and a connecting passageway formed in connection between the accessory positioning cavity and the conduit channel.

2. The landscaping structure system of claim 1 wherein:

a number of the accessory positioning cavities each have a water sprinkler head accessory positioned therein.

3. The landscaping structure system of claim 1 wherein:

a number of the accessory positioning cavities each have a lamp fixture positioned therein.

4. The landscaping structure system of claim 1 wherein:

a number of post portions having a number of timber member receiving brackets secured to a sidewall thereof, each timber member receiving bracket being sized to receive an end of a timber member;

each of the timber member receiving brackets including vertical post member attachment apertures and a conduit connecting aperture provided through a back surface thereof and two timber section attachment apertures formed through opposed bracket sidewalls.

5. A landscaping structure system comprising:

a number of straight fill timber sections, a number of right angle fill timber sections, a number of curved fill timber sections, a number of straight accessory timber sections, a number of right angle accessory timber sections, a number of curved accessory timber sections, a length of sprinkler feed hose having a first diameter, and a number of vertical anchor members having a second diameter; each of the number of straight fill timber sections, the number of right angle fill timber sections, the number of curved fill timber sections, the number of straight accessory timber sections, the number of right angle accessory timber sections, and the number of curved accessory timber sections having a sprinkler feed hose channel formed into an interior sidewall adjacent each end thereof being of a feed hose channel diameter sized to friction fit receive a section of the length of sprinkler feed hose, each sprinkler feed hose channel having a semicircular channel cross section of with an angular displacement of between 190 and 220 degrees such that a section of the length of sprinkler feed hose is held in place once snap fit therein; each of the number of straight fill timber sections, the number of right angle fill timber sections, the number of curved fill timber sections, the number of straight accessory timber sections, the number of curved accessory timber sections and the number of right angle accessory timber sections having a plurality of vertical anchor member receiving apertures formed therethrough between top and bottom timber section surfaces and positioned such that at least one vertical anchor member receiving aperture of one timber section is alignable with at least one vertical anchor member receiving aperture of a second timber section supported thereon to build a structure to allow a vertical anchor member to be positioned through the aligned vertical anchor member receiving apertures and into the ground to anchor multiple timber sections in place; each of the number of straight accessory timber sections, the number of curved accessory timber sections and the number of right angle accessory timber sections also including a conduit channel formed into a bottom surface thereof along the entire length thereof, an accessory positioning cavity formed into a top surface thereof, a removable cap member for covering an opening through the top surface into the accessory positioning cavity, and a connecting passageway formed in connection between the accessory positioning cavity and the conduit channel.

6. The landscaping structure system of claim 5 wherein:

a number of the accessory positioning cavities each have a water sprinkler head accessory positioned therein.

7. The landscaping structure system of claim 5 wherein:

a number of the accessory positioning cavities each have a lamp fixture positioned therein.

8. The landscaping structure system of claim 5 wherein:

a number of post portions having a number of timber member receiving brackets secured to a sidewall thereof, each timber member receiving bracket being sized to receive an end of a timber member;

each of the timber member receiving brackets including vertical post member attachment apertures and a conduit connecting aperture provided through a back surface thereof and two timber section attachment apertures formed through opposed bracket sidewalls.

* * * * *